United States Patent
Iyengar et al.

(10) Patent No.: US 10,824,945 B2
(45) Date of Patent: Nov. 3, 2020

(54) MACHINE-LEARNING SYSTEM AND METHOD THEREOF TO MANAGE SHUFFLING OF INPUT TRAINING DATASETS

(71) Applicant: AgreeYa Mobility Inc., Mountain View, CA (US)

(72) Inventors: Raghu Sesha Iyengar, Bangalore (IN); Vineeth Nallure Balasubramanian, Sangareddy (IN)

(73) Assignee: AGREEYA MOBILITY INC., Mountain View, CA (US)

( * ) Notice: Subject to any disclaimer, the term of this patent is extended or adjusted under 35 U.S.C. 154(b) by 827 days.

(21) Appl. No.: 15/486,787

(22) Filed: Apr. 13, 2017

(65) Prior Publication Data

US 2017/0300829 A1 Oct. 19, 2017

(30) Foreign Application Priority Data

Apr. 15, 2016 (IN) .............................. 201641013266

(51) Int. Cl.
*G06N 3/08* (2006.01)
(52) U.S. Cl.
CPC ................... *G06N 3/084* (2013.01)
(58) Field of Classification Search
USPC ........................................................ 706/12
See application file for complete search history.

(56) References Cited

U.S. PATENT DOCUMENTS

| | | | |
|---|---|---|---|
| 5,659,667 A | 8/1997 | Buescher et al. | |
| 8,452,718 B2 | 5/2013 | Jin et al. | |
| 8,880,525 B2 | 4/2014 | Galle et al. | |
| 9,129,228 B1 | 9/2015 | Szegedy | |
| 9,189,455 B2 | 11/2015 | Bouchard | |
| 9,733,992 B1* | 8/2017 | Poeluev | G06F 21/57 |
| 2014/0046880 A1 | 2/2014 | Breckenridge et al. | |

(Continued)

FOREIGN PATENT DOCUMENTS

| | | |
|---|---|---|
| CN | 102024180 B | 4/2013 |
| CN | 105243398 A | 1/2016 |
| EP | 0577694 B1 | 5/1999 |

OTHER PUBLICATIONS

Sebastian Rudek, An overview of gradient descent optimization algorithms.

(Continued)

*Primary Examiner* — Michael B Holmes (57) ABSTRACT

Embodiments herein achieve a machine-learning system for managing shuffling of input training datasets. The machine-learning system includes a training dataset manager configured to shuffle an input dataset received from each of a plurality of electronic devices. Further, the training dataset manager is configured to split the input training datasets into a plurality of mini-batches. Each of the mini-batches, along with the target values, defines an error surface corresponding to an error function. A learning manager is configured to obtain a cross mini-batch discriminator based on the error function for each of the mini-batches. Further, the learning manager is configured to select a mini-batch associated with a least cross mini-batch discriminator from the plurality of mini-batches as optimal mini-batch.

20 Claims, 7 Drawing Sheets

(56) References Cited

U.S. PATENT DOCUMENTS

| | | |
|---|---|---|
| 2014/0164299 A1 | 6/2014 | Sainath et al. |
| 2014/0278339 A1 | 9/2014 | Konstantinos et al. |
| 2015/0161988 A1 | 6/2015 | Dognin et al. |
| 2016/0012330 A1 | 1/2016 | Pescianschi |
| 2017/0206457 A1* | 7/2017 | Roychowdhury ..... G06N 20/00 |

OTHER PUBLICATIONS

Mu Li et al., Efficient Mini-batch Training for Stochastic Optimization, Carnegie Mellon University.

Richard et al., Sample Size Selection in Optimization Methods for Machine Learning, 2011.

* cited by examiner

MACHINE-LEARNING SYSTEM AND METHOD THEREOF TO MANAGE SHUFFLING OF INPUT TRAINING DATASETS

TECHNICAL FIELD

The present disclosure relates to a machine-learning system, and more particularly relates to a machine-learning system and method thereof to manage shuffling of input training datasets. The present application is based on, and claims priority from an Indian provisional application No. 201641013266 filed on Apr. 15, 2016 the disclosure of which is hereby incorporated by reference herein.

BACKGROUND

A gradient descent method is often used to train a machine learning system like neural network. In a batch gradient descent, weight changes are accumulated over an entire training data set and applied after an epoch. In an online gradient descent method, the weights are updated after every training data is presented. Further, for a large dataset, no immediate changes in the weight update is seen when using the full batch gradient descent. However, the weight changes provide effect immediately with the online gradient descent. In a mini batch gradient descent, the weight changes are accumulated for "m" inputs and then applied. In an example, the mini batch gradient descent converges to full batch gradient descent if m=N (where N is the total number of input samples) and online gradient descent if m=1.

Further, gradient computations for each mini-batch can be parallelized, allowing the mini batch gradient descent method to perform faster in a distributed framework. For the distributed framework, machines or devices may need to communicate with each other for every mini batch to synchronize shared variables.

Hence, a large mini batch size decreases a communication cost, but also slows down the convergence rate in practice. However, all the mini batch gradient descent, the gradient descent, and the online gradient descent methods aim to achieve minima on an overall error surface.

SUMMARY

The principal object of the embodiments herein to provide a method and system to manage shuffling of input training datasets to train a machine-learning system.

Another object of the embodiments herein is to shuffle an input dataset received from each of electronic devices.

Another object of the embodiments herein is to split the input training datasets into a plurality of mini-batches.

Another object of the embodiments herein is to obtain a cross mini-batch discriminator based on the error function for each of the mini-batches.

Another object of the embodiments herein is to select a mini-batch configuration associated with a least cross mini-batch discriminator from the plurality of mini-batch configurations as optimal mini-batch configuration.

Embodiments herein disclose a method to manage shuffling of input training datasets to train a machine-learning system. The method includes shuffling, by a training dataset manager, an input dataset received from each of a plurality of electronic devices. Further, the method includes splitting, by the training dataset manager, the input training datasets into a plurality of mini-batches. Each of the mini-batches along with the corresponding target values, define an error surface corresponding to an error function. Further, the method includes obtaining, by a learning manager, a cross mini-batch discriminator based on the error function for each of the mini-batches. Further, the method includes selecting a mini-batch associated with a least cross mini-batch discriminator from the plurality of mini-batch configurations as optimal mini-batch configuration.

In an embodiment, the cross mini-batch discriminator is defined as a function evaluated as the sum of a differences in an error converged on by every mini-batch and the initial error on the error surface formed by the subsequent mini-batch for at least one specific mini-batch configuration from the plurality of mini-batch configurations using a gradient descent based method. The error on the error surface is formed by a subsequent mini-batch from the plurality of mini-batches. The cross mini-batch score is defined as the final score evaluated by the cross mini-batch discriminator for a given mini-batch configuration In an embodiment, the gradient descent based method is performed as an attempt to reach a minimum point or a saddle point or a critical point on the error surface defined by the mini-batch configuration.

In an embodiment, the cross mini-batch discriminator is equivalent for minimizing the difference in the error between error surfaces of at least one specific mini-batch configuration and the subsequent mini-batch configuration, which leads to faster convergence.

In an embodiment, the error surface is characterized based on a training input and target values corresponding to each of the mini-batches.

In an embodiment, the error surface formed from the mini-batches is a Mean Squared Error surface.

In an embodiment, the error surface is defined as an arbitrary function with at least one the critical point or the minimum point or the saddle point defined over the mini-batches.

In an embodiment, the error surface is dynamically changed while traversing from one mini-batch to other mini-batches in the plurality of mini-batches.

In an embodiment, the cross mini-batch discriminator is minimized using a brute force method.

In an embodiment, the brute force method can be used to evaluate the cross mini-batch discriminator for the plurality of mini-batch configurations which are formed by random permutations of the input datasets.

In an embodiment, the cross mini-batch discriminator is minimized by posing the cross mini-batch discriminator minimization as a non-linear optimization problem.

In an embodiment, the cross mini-batch discriminator is minimized by posing the cross mini-batch discriminator minimization as a sub-modular optimization problem.

In an embodiment, the cross mini-batch discriminator is minimized by posing the cross mini-batch discriminator minimization as a probabilistic formulation.

In an embodiment, the cross mini-batch discriminator is minimized by posing the cross mini-batch discriminator minimization as an optimization formulation.

Embodiments herein disclose a machine-learning system for managing shuffling of input training datasets. The machine-learning system includes a training dataset manager configured to shuffle an input dataset received from each of a plurality of electronic devices. Further, the training dataset manager is configured to split the input training datasets into a plurality of mini-batches. Each of the mini-batches, along with the corresponding target values, define an error surface corresponding to an error function. A learning manager is configured to obtain a cross mini-batch discriminator based on the error function for each of the mini-batch configurations. Further, the learning manager is configured to select a mini-batch configuration associated with a least cross mini-batch discriminator from the plurality of mini-batch configurations as optimal mini-batch configuration.

Accordingly, the embodiment herein provides a computer program product including a computer executable program code recorded on a computer readable non-transitory storage medium. The computer executable program code when executed causing the actions including shuffling, by a training dataset manager, an input dataset received from each of a plurality of electronic devices. The computer executable program code when executed causing the actions including splitting, by the training dataset manager, the input training datasets into a plurality of mini-batches. Each of the mini-batches, along with the corresponding target values, define an error surface corresponding to an error function. The computer executable program code when executed causing the actions including obtaining, by a learning manager, a cross mini-batch discriminator based on the error function for each of the mini-batch configurations. The computer executable program code when executed causing the actions including selecting a mini-batch configuration associated with a least cross mini-batch discriminator from the plurality of mini-batch configurations as optimal mini-batch configuration.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF EMBODIMENTS

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein disclose a machine-learning system for managing shuffling of input training datasets. The machine-learning system includes a training dataset manager configured to shuffle an input dataset received from each of a plurality of electronic devices, and split the input training datasets into a plurality of mini-batches. Each of the mini-batches described herein defines an error surface corresponding to an error function. A learning manager is configured to obtain a cross mini-batch discriminator based on the error function for each of the mini-batches. Further, the learning manager is configured to select a mini-batch configuration associated with a least mini-batch discriminator score from the plurality of mini-batch configurations as optimal mini-batch.

The conventional mini batch gradient descent methods are widely used in training machine learning methods like neural networks and are thought to be a compromise between full batch gradient descent, which gives an optimum convergence and stochastic gradient descent. The mini batch gradient descent methods are a feasible alternative for large data sets where a full batch gradient descent cannot be applied efficiently. The training data is shuffled before splitting into mini batches with a hope that each set of data represents the global error surface, as closely as possible. However, there is no efficient mechanism known, to predict the efficiency of shuffling on the input data. Unlike the conventional methods, the proposed method can be used to predict the 'goodness' with which the data can be shuffled and assist to choose the best shuffled data to perform full training on the machine-learning system.

Unlike the conventional methods, the proposed method can be used to perform a characterization of a discrimination between the error surfaces of various mini batches. Thus, a parameter can be seen as a measure of efficiency of shuffling performed on the input data.

In an example, there are 4 data points (call it as R, G, B and Y), so, the dataset size=4, and let the mini batch size=2.

Now, there are many ways of forming these mini batches. A first mini-batch configuration: RG, BY, a second mini-batch configuration: RB, GY, and a third mini-batch configuration: RY, BG etc.

so, (RG, BY) is a mini batch configuration, while RG is a mini-batch, BY is a mini-batch, and so on The rnumber is defined for each of these configurations. So, rnumber (first mini-batch configuration: RG, BY)=100, rnumber (second mini-batch configuration: RB, GY)=150 etc.

The proposed method can be used to provide a mini-batch configuration that has least mini-batch discriminator score and it will converge faster to the final weights in the network.

Referring now to the drawings and more particularly to FIGS. 1 through 7, where similar reference characters denote corresponding features consistently throughout the figure, there are shown preferred embodiments.

Figure 1:
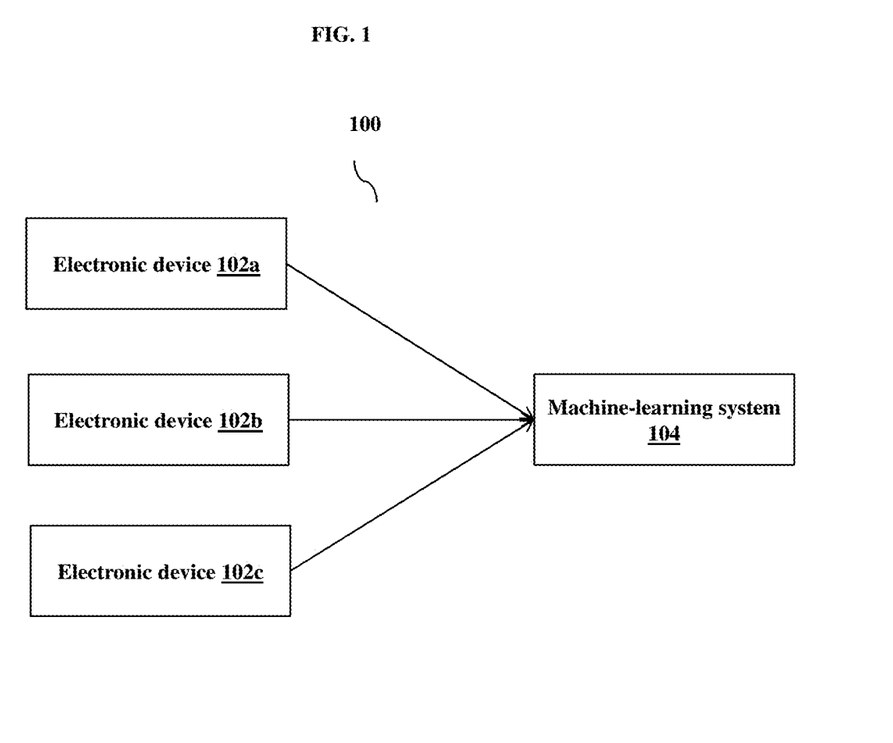
FIG. 1 illustrate generally, among other things, a high level overview to manage shuffling of input training datasets in a machine-learning system, according to embodiments as disclosed herein.

FIG. 1 illustrate generally, among other things, a high level overview 100 to manage shuffling of input training datasets in a machine-learning system 104, according to embodiments as disclosed herein. In an embodiment, the overview 100 includes a plurality of electronic devices 102a to 102c (hereafter label of the electronic devices is 102) and the machine-learning system 104. The machine-learning system 104 is configured to shuffle an input dataset received from each of the plurality of electronic devices 102. In an embodiment, the electronic devices 102 receives the input dataset from a memory device. In an embodiment, the electronic device receives the input dataset from one or more network devices through a network. After shuffling the input dataset received from each of the plurality of electronic devices 102, the machine-learning system 104 is configured to split the input training datasets into a plurality of mini-batches. Each of the mini-batches defines an error surface corresponding to an error function. After splitting the input training datasets into the plurality of mini-batches, the machine-learning system 104 is configured to obtain a cross mini-batch discriminator based on the error function for each of the mini-batches. Further, the machine-learning system 104 is configured to select a mini-batch associated with a least mini-batch discriminator from the plurality of mini-batches as optimal mini-batch.

In an embodiment, each mini-batch is selected by different electronic devices 102. In an embodiment, each mini-batch is selected by same electronic device 102.

In an embodiment, the cross mini-batch discriminator is estimated as a function of a difference in an error converged on at least one specific mini-batch configuration from the plurality of mini-batch configurations.

In an embodiment, the cross mini-batch discriminator is computed as sum of differences in error over all mini batches.

In an embodiment, the cross mini-batch discriminator is defined as a score or value which is calculated as a function of the difference in the error value converged on a specific mini-batch and an initial error value on the error surface formed by a subsequent mini-batch.

In an embodiment, the error on the error surface is formed by a subsequent mini-batch from the plurality of mini-batches, along with the corresponding target values.

In an embodiment, the gradient descent based method is performed as an attempt to reach a minimum point on the error surface defined by each of the mini-batches.

In an embodiment, the gradient descent based method is performed as an attempt to reach the critical point on the error surface defined by each of the mini-batches.

In an embodiment, the gradient descent based method is performed as the attempt to reach a saddle point on the error surface defined by each of the mini-batches.

In an embodiment, the least cross mini-batch discriminator is equivalent for minimizing the difference in the error between error surfaces of the at least one specific mini-batch configuration and the subsequent mini-batch configuration, which leads to faster convergence.

In an embodiment, the error surface is characterized based on the training input and target values corresponding to each of the mini-batches.

In an embodiment, the error surface formed from the mini-batches is a Mean Squared Error (MSE) surface.

In an embodiment, the error surface is defined as an arbitrary function with at least one minima point defined over the mini-batches.

In an embodiment, the error surface is defined as an arbitrary function with the critical point defined over the mini-batches.

In an embodiment, the error surface is defined as an arbitrary function with the saddle point defined over the mini-batches.

In an embodiment, the error surface is dynamically changed while traversing from one mini-batch to other mini-batch in the plurality of mini-batches.

In an embodiment, the cross mini-batch discriminator is minimized using a brute force method. The brute force method can be used to evaluate the cross mini-batch discriminator for the plurality of mini-batches which are formed by random permutations of the input datasets.

In an embodiment, the cross mini-batch discriminator is minimized by posing the cross mini-batch discriminator minimization as an optimization formulation.

In an embodiment, the cross mini-batch discriminator is minimized by posing the cross mini-batch discriminator minimization as a non-linear optimization problem.

In an embodiment, the cross mini-batch discriminator is minimized by posing the cross mini-batch discriminator minimization as a sub modular optimization problem.

In an embodiment, the cross mini-batch discriminator is minimized by posing the cross mini-batch discriminator minimization as a probabilistic formulation.

In an embodiment, the proposed method can be used to select the best mini-batch configuration from the set of mini batch configurations.

The FIG. 1 shows the limited overview of the overview 100 but, it is to be understood that other embodiments are not limited thereto. Further, the overview 100 can include any number of hardware or software components communicating with each other. For example, the component can be, but not limited to, a process running in the controller or processor, an object, an executable process, a thread of execution, a program, or a computer.

Figure 2:
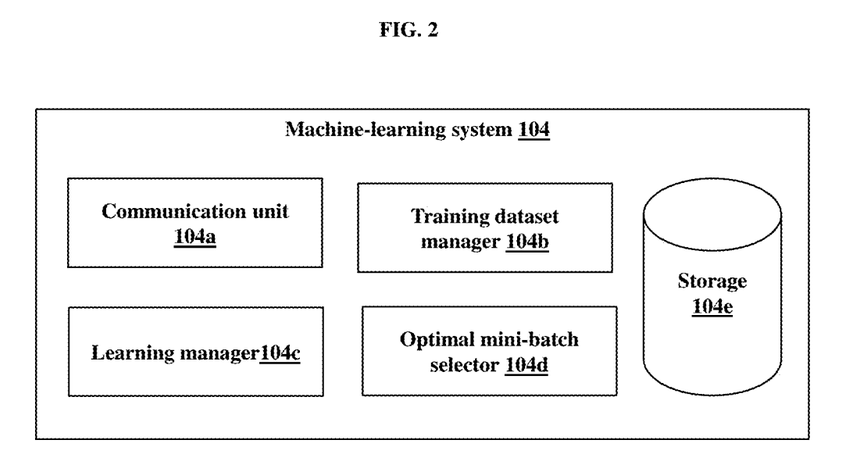
FIG. 2 illustrates various units of the machine-learning system, according to embodiments as disclosed herein.

FIG. 2 illustrates various units of the machine-learning system 104, according to embodiments as disclosed herein. The machine-learning system 104 includes a communication unit 104a, a training dataset manager 104b, a learning manager 104c, an optimal mini-batch selector 104d, and a storage 104e. The training dataset manager 104b is in communication with the communication unit 104a, the learning manager 104c, the optimal mini-batch selector 104d, and the storage 104e. The communication unit 104a is configured for communicating internally between internal units and with external devices via one or more networks.

The training dataset manager 104b is configured to shuffle the input dataset received from the plurality of electronic devices 102. Based on shuffling the input dataset received from the plurality of electronic devices 102, the training dataset manager 104b is configured to split the input training datasets into the plurality of mini-batches. Each of the mini-batches, along with corresponding target values, define the error surface corresponding to the error function. Based on the error function for each of the mini-batches, the learning manager 104c is configured to obtain the cross mini-batch discriminator. After obtaining the cross mini-batch discriminator, the optimal mini-batch selector 104d is configured to select the mini-batch configuration associated with the least cross mini-batch discriminator from the plurality of mini-batch configurations as optimal mini-batch.

Further, the storage 104e may include one or more computer-readable storage media. The storage unit 104e may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the storage 104e may, in some examples, be considered a non-transitory storage medium. The term "non-transitory" may indicate that the storage medium is not embodied in a carrier wave or a propagated signal. However, the term "non-transitory" should not be interpreted that the storage 104e is non-movable. In some examples, the storage 104e can be configured to store larger amounts of information than a memory. In certain examples, a non-transitory storage medium may store data that can, over time, change (e.g., in Random Access Memory (RAM) or cache).

Although FIG. 2 shows exemplary units of the machine-learning system 104, in other implementations, the machine-learning system 104 may include fewer components, different components, differently arranged components, or additional components than depicted in the FIG. 2. Additionally or alternatively, one or more components of the machine-learning system 104 may perform functions described as being performed by one or more other components of the machine-learning system 104.

Figure 3:
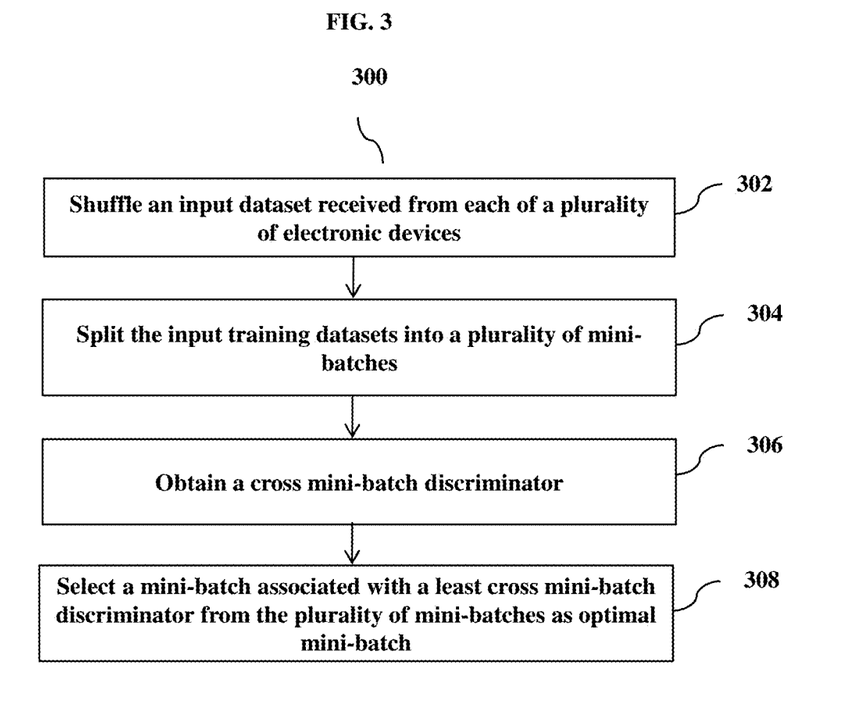
FIG. 3 is a flow diagram illustrating a method to manage shuffling of input training datasets in the machine-learning system, according to embodiments as disclosed herein.

FIG. 3 is a flow diagram 300 illustrating a method to manage shuffling of input training datasets in the machine-learning system 104, according to embodiments as disclosed herein. At 302, the method includes shuffling the input dataset received from each of the plurality of electronic devices 102. In an embodiment, the method allows the training dataset manager 104b to shuffle the input dataset received from the plurality of electronic devices 102. At 304, the method includes splitting the input training datasets into the plurality of mini-batches. In an embodiment, the method allows the training dataset manager 104b to split the input training datasets into the plurality of mini-batches. The mini-batches, along with corresponding target values, define the error surface corresponding to the error function. At 306, the method includes obtaining the cross mini-batch discriminator based on the error function for each of the mini-batch configurations. In an embodiment, the method allows the learning manager 104c to obtain the cross mini-batch discriminator based on the error function for each of the mini-batch configuration. At 308, the method includes selecting the mini-batch associated with the least cross mini-batch discriminator from the plurality of mini-batch configurations as optimal mini-batch configuration. In an embodiment, the method allows the optimal mini-batch selector 104d to select the mini-batch configuration associated with the least cross mini-batch discriminator from the plurality of mini-batch configurations as optimal mini-batch configuration.

Unlike the conventional methods, the proposed method can be used to evaluate the efficiency of shuffling and optimize the shuffling of input training datasets to train the machine-learning system 104 and a deep learning system.

The various actions, acts, blocks, steps, and the like in the flow diagram 300 may be performed in the order presented, in a different order or simultaneously. Further, in some embodiments, some actions, acts, blocks, steps, and the like may be omitted, added, modified, skipped, and the like without departing from the scope of the invention.

Figure 4:
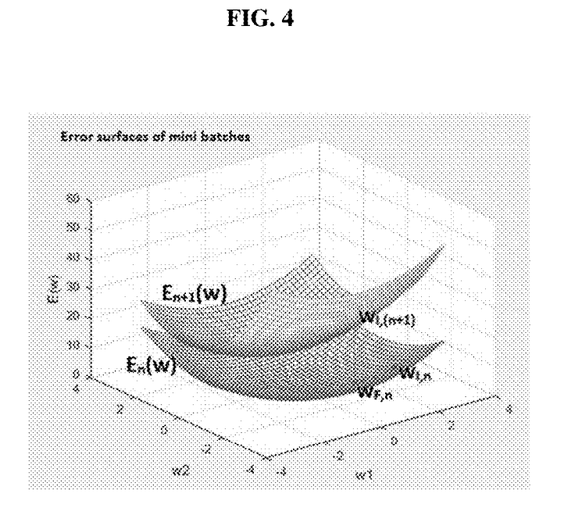
FIG. 4 illustrates an example scenario in which a hypothetical error surface represents error surfaces of $n^{th}$ mini batch and $(n+1)^{th}$ mini batch in a specific mini-batch configuration, according to an embodiment as disclosed herein.

FIG. 4 illustrates an example scenario in which a hypothetical error surface represents error surfaces of $n^{th}$ mini batch and $(n+1)^{th}$ mini batch in a specific minibatch configuration, according to an embodiment as disclosed herein. The general optimization tasks involve finding a parameter set (w) that minimizes an error function E(w). Further, it is typical to assume that a first derivative of E(w) exists at all points. In case of supervised learning, the error function is a measure of the deviation of a state of the network to a target (or desired) state. Further, consider a very typical error function is frequently used in neural networks, known as Mean Squared Error (MSE). However, the arguments should hold for any other error surface too.

The MSE for the batch gradient descent is given by:

$$E_{MSE, Full\ Batch} = \frac{1}{2} \sum_{i=1}^{N} (t_i - h_w(x_i))^2$$

Where,
$t_i$ is the $i^{th}$ target state of the network
$x_i$ is the $i^{th}$ input sample
$h_w(x_i)$ is the prediction of the network for $i^{th}$ input sample and parameters w of the network. w and $x_i$ can be vectors if the input is multidimensional. In full batch gradient descent, all the N input and target data are used to characterize the error surface.

In full batch gradient descent, all the N input and target data are used to characterize the error surface. Approximations of the gradient of the error surface in the full batch gradient descent method is used to speed up gradient descent process. This is also applied to mini-batch gradient descent. When using the mini batch gradient descent, the MSE for every batch is given by:

$$E_{MSE, mini\ Batch} = \frac{1}{2}\sum_{i=1}^{N}(t_i - h_w(x_i))^2$$

Note that, here the summation is performed for m samples instead of all N samples. Hence, gradient descent is performed on the error surface that is defined by that set of target and input values. When performing the mini-batch gradient descent, it is a standard practice to start with a set of random values for the parameters ($w_i$) and perform a parameter update after every mini batch using the standard gradient descent rule as:

$$\Delta w = \eta \frac{\partial E}{\partial w}$$

where, $\eta$ is known as the learning rate and is chosen to be a small non-negative value. Note that there are other variants of gradient descent such as those that use the gradient from earlier steps to make this update, which would only be variants of this embodiment.

Furthermore, the updated parameters after $n^{th}$ mini-batch are taken as the initial values of the parameters for $(n+1)^{th}$ mini batch. This, as it turns out, may not be the best strategy. Consider two hypothetical error surfaces shown in the FIG. 4. These could be assumed to represent the error surfaces of the $n^{th}$ mini batch and $(n+1)^{th}$ mini batch. For illustration, assuming that the number of parameters in the neural network is only two (i.e., w1 and w2). Where $w_{I,n}$ represents the initial parameters for $n^{th}$ mini batch and $w_{F,n}$ represents the parameters after the parameter update using gradient descent for $n^{th}$ mini batch, $w_{I,(n+1)}$ represents the initial parameters for the $(n+1)^{th}$ mini batch. However, since the final parameters from $n^{th}$ mini batch are carried forward as initial parameters of $(n+1)^{th}$ mini batch, $w_{I,(n+1)}$ is same as $w_{F,n}$. As a consequence of this, it is possible that the initial point on the $(n+1)^{th}$ error surface is higher than the converged point on the $n^{th}$ surface. There are a number of tricks which transform the input data so that the average value of input data over the training set is zero, their covariance is about the same and they are uncorrelated. In effect, these operations on the input data tend to make the mini batch wise error surfaces as similar to each other as possible.

The existing methods fail to determine a better point on the $(n+1)^{th}$ error surface so that convergence can be faster. Further, the existing methods also fail to select the mini batch wise error surfaces so that when $w_{F,n}$ is used as $w_{I,(n+1)}$, the difference in error values on the two surfaces is minimized.

It is therefore clear, herein, that each mini batch defines its own error surface and there is a jump in the value of error function when training progresses from one mini batch to the other.

Let's define a parameter to measure the efficiency of shuffling; consider the difference $(E_{k+1}(w_{I,k+1})-E_k(w_{F,k}))$ and define the sum of such differences in error over all mini batches as rnumber. In an embodiment, the rnumber can be defined as the cross mini-batch discriminator.

$$rnumber = \sum_{k=1}^{m-1} \text{abs}(E_{k+1}(w_{I,k+1}) - E_k(w_{F,k}))$$

where, k is the summation over all mini batches in a given mini batch configuration. $E_{k+1}(w_{I,k+1})$ is the error value on the $(k+1)^{th}$ mini batch surface for the initial parameters on the $(k+1)^{th}$ mini batch surface. $E_k(w_{F,k})$ is the error value on the $k^{th}$ mini batch surface for the final parameters on the $k^{th}$ mini batch surface. $w_{I,k+1}$ may or may not be same as $w_{F,k}$. The error surfaces ($E_{k+1}(.)$ and $E_k(.)$) are different and depend on the training input and target values for those mini batches.

The definition of rnumber above is only an example. This definition can be changed without affecting the invention. Any alternate function that considers the error surfaces formed by the individual mini batches to improve performance, may also be covered in this disclosure.

For most of the current implementations, $w_{I,k+1}$ is the same as $w_{F,k}$.

The proposed method can be used to determine a better point on the $(n+1)^{th}$ error surface so that convergence can be achieved faster.

Consider that the surfaces are convex. In that case, if $(E_{k+1}(w_{I,k+1})-E_k(w_{F,k}))$ is a positive number (implying that the weights from the $k^{th}$ mini-batch which are used to initialize the weights in the $(k+1)^{th}$ mini batch leads to a point much higher on the error surface of the $(K+1)^{th}$ mini batch), then there is a better point on the surface $E_{k+1}(.)$ which can lead to faster convergence to minima of $E_{k+1}(.)$. This new point is any one of the points of intersection of the hyper surface $E_{k+1}(.)$ and hyperplane $z=E_k(w_{F,k})$. Note that it is possible that there is no point of intersection, in that case, assume that the mini batch surfaces $E_{k+1}(.)$ and $E_k(.)$ are not as similar as ideally needed. This is typically a consequence of the input data not being transformed properly or the shuffling is not efficiently randomizing the features into all mini batches.

Another trivial case is when, $(E_{k+1}(w_{I,k+1})-E_k(w_{F,k}))$ is a negative number. In this case, $w_{I,(k+1)}$ can be used as the initial parameters on $E_{k+1}(.)$ and perform gradient descent as usual.

Any analytical, approximation or iterative technique that can be used to find one of the points of such an intersection between hyper surface $E_{k+1}(.)$ and hyperplane $z=E_k(w_{F,k})$ is covered in this disclosure.

The proposed method can be used to choose the mini batch wise error surfaces so that when $w_{F,k}$ is used as $w_{I,(k+1)}$, the difference in error values on the two surfaces are minimized.

Note that this is same as minimizing the rnumber as defined earlier. It is clear that for a given training data set, shuffling determines the value of rnumber. The number of ways in which a training data set with N entries can be shuffled into mini batches of size m is given by $$\frac{(N)!}{\left(\frac{N}{m}\right)!(m!)^{\frac{N}{m}}}$$

Any analytical, approximation or iterative technique that can be used to choose the mini batch training samples, leading to a minimization of the rnumber parameter defined earlier, is covered in this disclosure.

Figure 5A:
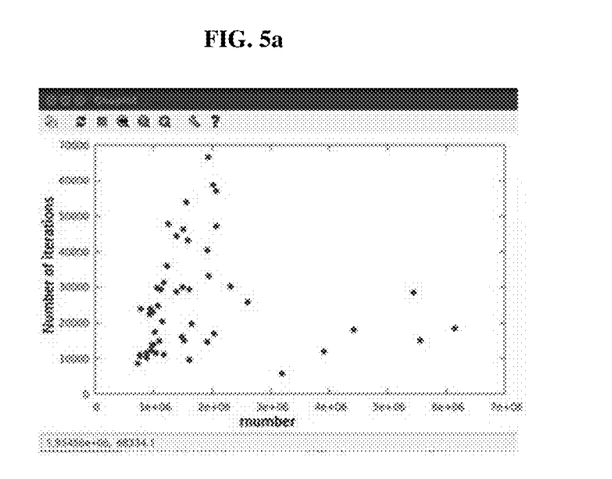
FIGS. 5a-5c illustrate example graphs representing a number of iterations needed to converge to within 1% accuracy versus cross mini-batch discriminator, according to an embodiment as disclosed herein.
Figure 5B:
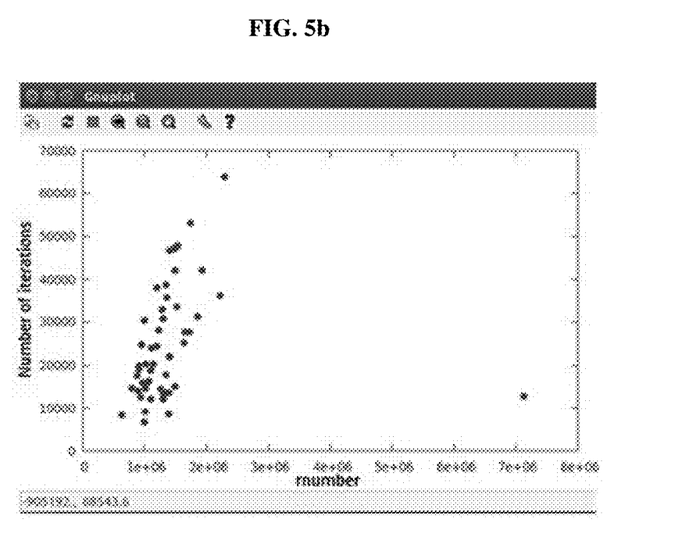
Figure 5C:
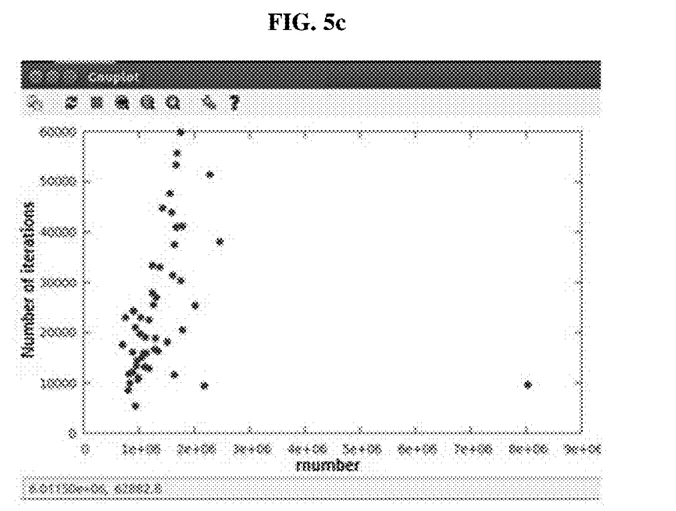

FIGS. 5a-5c illustrate example graphs representing number of iterations needed to converge to within 1% accuracy of true target value for each input data point versus the rnumber, according to an embodiment as disclosed herein. The graphs represent number of iterations needed to converge to within 1% accuracy of true target value for each input data point versus the rnumber. Each plot shows 50 separate sets of mini batches obtained by random shuffling. The plots show fairly strong dependence of the number of iterations on the rnumber.

The hypothesis is that for a set of mini batches, the number of iterations needed to arrive at the true solution within a certain accuracy (1% in this case) is a function of the rnumber for that set of mini batches. The reasoning for this is that if the rnumber is less for a given set of mini batches, all the mini batch error surfaces are very similar to each other and hence convergence should be faster.

Figure 6:
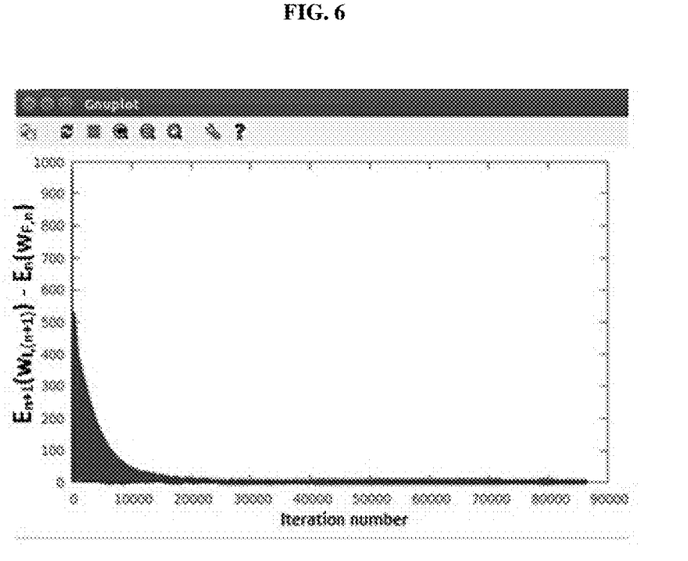
FIG. 6 illustrates an example graph representing abs($E_{k+1}(w_{I,(k+1)}) - E_k(w_{F,k})$) (versus the parameter set w, where, ($E_{k+1}(w_{I,(k+1)})$) is the error value on the $(k+1)^{th}$ mini batch surface for the initial parameters on the $(k+1)^{th}$ mini batch surface. $E_k(w_{F,k})$ is the error value on the $k^{th}$ mini batch surface for the final parameters on the $k^{th}$ mini batch surface. For most of current implementations, $w_{F,k}$ is same as $w_{I,(k+1)}$, according to an embodiment as disclosed herein.

FIG. 6 illustrates an example graph representing abs($E_{k+1}(w_{I,(k+1)}) - E_k(w_{F,k})$) versus the parameter set w, where, $E_{k+1}(w_{I,(k+1)})$ is the error value on the $(k+1)^{th}$ mini batch surface for the initial parameters on the $(k+1)^{th}$ mini batch surface. $E_k(w_{F,k})$ is the error value on the $k^{th}$ mini batch surface for the final parameters on the $k^{th}$ mini batch surface. For most of current implementations, $w_{F,k}$ is same as $w_{I,(k+1)}$, according to an embodiment as disclosed herein. The area under this curve is rnumber. This curve is characteristic of the manner in which the data is shuffled and divided into mini batches.

Further, another feature to note from the above plot is that abs($E_{k+1}(w_{I,(k+1)}) - E_k(w_{F,k})$) decreases as the number of iterations increases. This is expected since the iterations converge to true solution as number of iterations increases. So, the rnumber gets very close to its final value for a given set of mini batches in a fraction of the total number of iterations needed for convergence. It is clear that there is a dependence of the number of iterations taken to converge on the rnumber. A couple of methods that use this observation to improve on convergence are described below. These are only sample applications of this observation. Any analytical, approximation or iterative methods that use this observation are covered in this disclosure.

It is observed that the number of iterations to converge to within 1% of true result varies from one set of mini batch to other set drastically. So, it is beneficial to search for a mini batch with least rnumber. Since it is observed that the rnumber attains values close to its final value in a fraction of the total number of iterations, one method is to divide the training data into m mini-batches randomly and run all the sets of mini batches for β iterations. The hyper parameter β has to be obtained by trial and error. Further, compare the rnumber of each set of mini batch and pick the batch with least rnumber for full training.

Since the proposed method requires the set of mini batches with least rnumber, it is also beneficial to terminate training of a particular set of mini batches when rnumber exceeds the minimum value seen till the current time.

The experimental set-up/results herein are merely for demonstrating purpose and not limited thereto. The results may vary depending on the condition.

Figure 7:
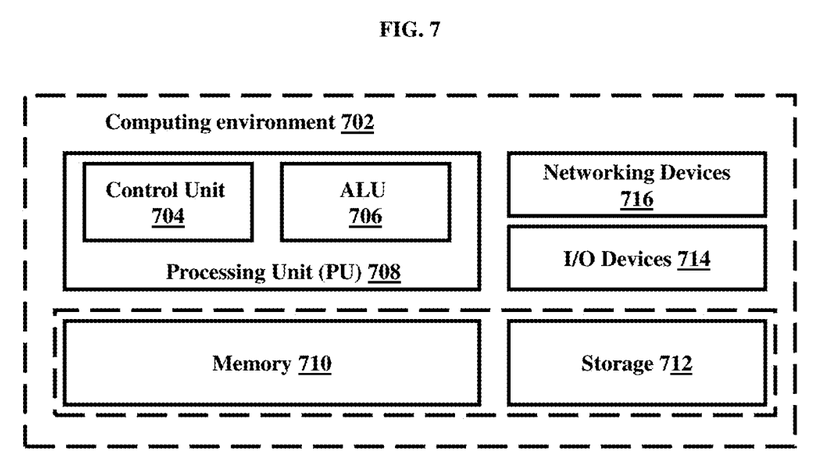
FIG. 7 illustrates a computing environment implementing the method to manage shuffling of input training datasets to train the machine-learning system, according to embodiments as disclosed herein.

FIG. 7 illustrates a computing environment 702 implementing the method to manage shuffling of input training datasets to train the machine-learning system 104, according to an embodiment as disclosed herein. As depicted in the figure, the computing environment 702 comprises at least one processing unit 708 that is equipped with a control unit 704, an Arithmetic Logic Unit (ALU) 706, a memory 710, a storage unit 712, a plurality of networking devices 716 and a plurality Input output (I/O) devices 714. The processing unit 708 is responsible for processing the instructions of the technique. The processing unit 708 receives commands from the control unit 704 in order to perform its processing. Further, any logical and arithmetic operations involved in the execution of the instructions are computed with the help of the ALU 706.

The overall computing environment 702 can be composed of multiple homogeneous or heterogeneous cores, multiple CPUs of different kinds, special media and other accelerators. The processing unit 708 is responsible for processing the instructions of the technique. Further, the plurality of processing units 704 may be located on a single chip or over multiple chips.

The technique comprising of instructions and codes required for the implementation are stored in either the memory unit 710 or the storage 712 or both. At the time of execution, the instructions may be fetched from the corresponding memory 710 or storage 712, and executed by the processing unit 708.

In case of any hardware implementations various networking devices 716 or external I/O devices 714 may be connected to the computing environment 702 to support the implementation through the networking unit and the I/O device unit.

The embodiments disclosed herein can be implemented through at least one software program running on at least one hardware device and performing network management functions to control the elements. The elements shown in the FIGS. 1 to 7 include blocks each of which can be at least one of a hardware device, or a combination of hardware device and software module.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A machine-learning system for managing shuffling of input training datasets, the machine-learning system comprising:
a memory; and
a processor, coupled with the memory, configured to:
shuffle an input dataset received from each of a plurality of electronic devices;
split the input training datasets into a plurality of mini-batches, wherein each of the mini-batches define an error surface corresponding to an error function, wherein the error surface is defined as an arbitrary function with at least one minima, defined over the mini-batches;

obtain a cross mini-batch discriminator based on the error function and previous mini-batch for each of the mini-batches; and select a mini-batch associated with a least cross mini-batch discriminator from the plurality of mini-batches as optimal mini-batch.

2. The machine-learning system of claim 1, wherein the cross mini-batch discriminator is estimated as a sum of a difference in an error converged on by every mini-batch and an initial error on the error surface formed by a subsequent mini-batch for at least one specific mini-batch configuration from the plurality of mini-batch configurations using a gradient descent based method, wherein the error on the error surface is formed by the subsequent mini-batch from the plurality of mini-batches.

3. The machine-learning system of claim 2, wherein the gradient descent based method is performed as an attempt to reach a minimum point on the error surface defined by each of the mini-batches.

4. The machine-learning system of claim 2, wherein the least cross mini-batch discriminator is equivalent for minimizing the difference in the error between error surfaces of the at least one specific mini-batch and the subsequent mini-batch leads to faster convergence.

5. The machine-learning system of claim 1, wherein the error surface is characterized based on training input, the arbitrary function and target values corresponding to each of the mini-batches.

6. The machine-learning system of claim 1, wherein the error surface formed from the mini-batches is the Mean Squared Error surface.

7. The machine-learning system of claim 1, wherein the error surface is dynamically changed while traversing from one mini-batch to other mini-batch in the plurality of mini-batches.

8. The machine-learning system of claim 1, wherein the cross mini-batch discriminator is minimized using a brute force method.

9. The machine-learning system of claim 8, wherein the brute force method is used to evaluate the cross mini-batch discriminator for a plurality of a set of mini-batches which are formed by random permutations of the input datasets.

10. The machine-learning system of claim 1, wherein the cross mini-batch discriminator is minimized by posing the cross mini-batch discriminator minimization as one of a non-linear optimization problem, a sub modular optimization problem, a probabilistic formulation, and an optimization formulation.

11. A method to manage shuffling of input training datasets to train a machine-learning system, the method comprising:

shuffling, by the machine learning system, an input dataset received from each of a plurality of electronic devices;

splitting, by the machine learning system, the input training datasets into a plurality of mini-batches, wherein each of the mini-batches define an error surface corresponding to an error function, wherein the error surface is defined as an arbitrary function with at least one minima, defined over the mini-batches;

obtaining, by the machine learning system, a cross mini-batch discriminator based on the error function and previous mini-batch for each of the mini-batches; and selecting, by the machine learning system, a mini-batch associated with a least cross mini-batch discriminator from the plurality of mini-batches as optimal mini-batch.

12. The method of claim 11, wherein the cross mini-batch discriminator is estimated as a sum of a difference in an error converged on by every mini-batch and an initial error on the error surface formed by a subsequent mini-batch for at least one specific mini-batch from the plurality of mini-batches using a gradient descent based method, wherein the error on the error surface is formed by the subsequent mini-batch from the plurality of mini-batches.

13. The method of claim 12, wherein the gradient descent based method is performed as an attempt to reach a minimum point on the error surface defined by each of the mini-batches.

14. The method of claim 12, wherein the least cross mini-batch discriminator is equivalent to minimizing the difference in the error between error surfaces of the at least one specific mini-batch and the subsequent mini-batch leads to faster convergence.

15. The method of claim 11, wherein the error surface is characterized based on training input, the arbitrary function and target values corresponding to each of the mini-batches.

16. The method of claim 11, wherein the error surface formed from the mini-batches is the Mean Squared Error surface.

17. The method of claim 11, wherein the error surface is dynamically changed while traversing from one mini-batch to other mini-batch in the plurality of mini-batches.

18. The method of claim 11, wherein the cross mini-batch discriminator is minimized using a brute force method.

19. The method in claim 18, wherein the brute force method is used to evaluate the cross mini-batch discriminator for a plurality of a set of mini-batches which are formed by random permutations of the input datasets.

20. The method of claim 11, wherein the cross mini-batch discriminator is minimized by posing the cross mini-batch discriminator minimization as one of a non-linear optimization problem, a sub modular optimization problem, a probabilistic formulation, and an optimization formulation.

* * * * *